United States Patent [19]

Muntjanoff

[11] 4,074,613
[45] Feb. 21, 1978

[54] VARIABLY BIASED CONTROL MECHANISM

[75] Inventor: John R. Muntjanoff, Aurora, Ill.

[73] Assignee: Caterpillar Tractor Co., Peoria, Ill.

[21] Appl. No.: 707,161

[22] Filed: July 21, 1976

Related U.S. Application Data

[62] Division of Ser. No. 543,579, Jan. 23, 1975, Pat. No. 3,990,552.

[51] Int. Cl.² ............... F15B 11/16; F15B 13/06
[52] U.S. Cl. ................................. 91/413; 91/460; 251/231; 251/251
[58] Field of Search ............... 91/413, 460, 280, 463; 251/251, 234, 231; 74/479; 60/571; 92/68

[56] References Cited

U.S. PATENT DOCUMENTS

| 26,301 | 11/1859 | Stoddart | 251/251 |
| 44,071 | 9/1864 | Brown | 251/251 |
| 287,877 | 11/1883 | Skinner | 251/251 |
| 415,671 | 11/1889 | Harris | 251/251 |
| 1,092,359 | 4/1914 | Heinrich | 251/251 |
| 2,279,597 | 4/1942 | Selmer | 192/12 C |
| 2,725,890 | 12/1955 | Kanuch | 91/413 X |
| 3,055,225 | 9/1962 | Miller | 251/251 X |
| 3,841,608 | 10/1974 | Schmitt et al. | 192/18 A |

FOREIGN PATENT DOCUMENTS 706,196  3/1965  Canada .................................. 60/571

Primary Examiner—Irwin C. Cohen
Attorney, Agent, or Firm—Phillips, Moore, Weissenberger, Lempio & Majestic

[57] ABSTRACT

A control mechanism for regulating operation of a rotatable winch drum through a power train including a brake which is normally engaged by hydraulic pressure to secure the winch drum against rotation and a normally disengaged clutch which is selectively engaged by hydraulic pressure for driving the winch drum in a reeling-in mode, the control mechanism including a control lever which is movable for selectively communicating hydraulic fluid to the brake and clutch, first and second biasing means being associated with the control lever to provide for adjustment of the lever at different rates of modulation.

4 Claims, 4 Drawing Figures

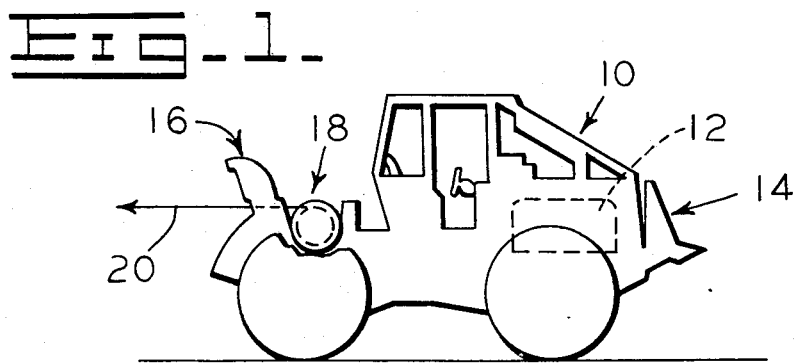
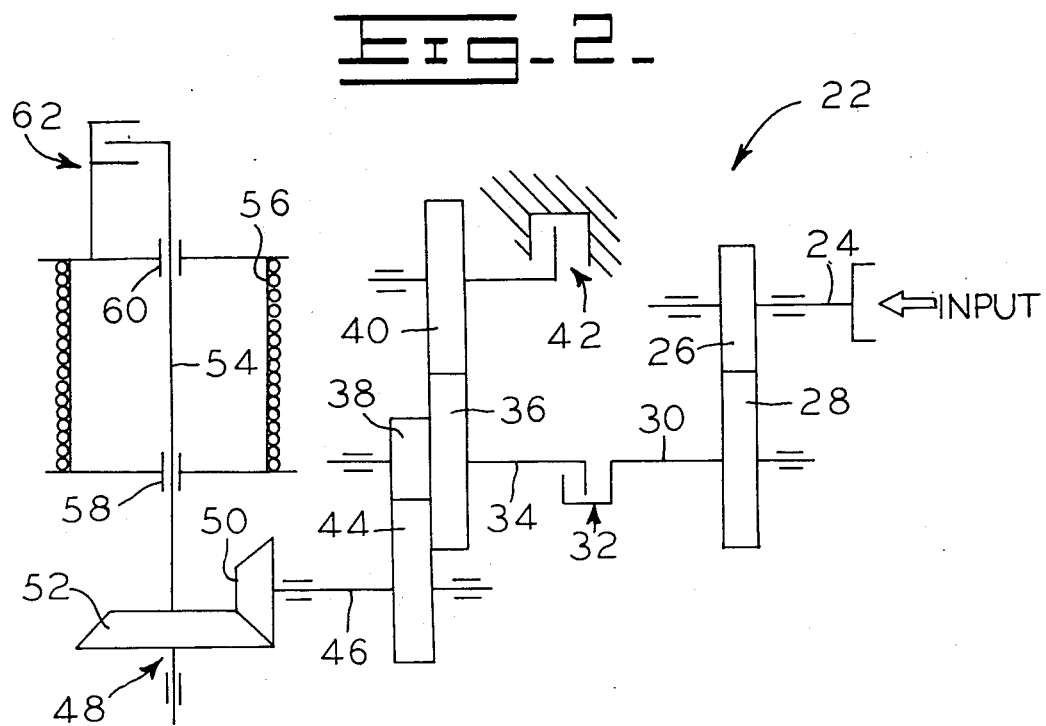

VARIABLY BIASED CONTROL MECHANISM

This is a division of Ser. No. 543,579, filed Jan. 23, 1975, now U.S. Pat. No. 3,990,552.

BACKGROUND OF THE INVENTION

The present invention relates to a control mechanism adapted to provide different rates of modulation depending upon the direction of movement for a control lever and more particularly to such a control mechanism adapted for regulating operation of a rotatable winch drum through a power train including a normally engaged brake and a normally disengaged clutch.

Within a winch unit of the type referred to above, it is common to provide for operator control over both reeling-in and reeling-out operation of the winch drum. For example, where the power train for the winch drum includes a normally engaged brake and a normally disengaged clutch, the brake may be gradually disengaged to permit reeling-out of cable from the winch drum while the clutch may be selectively engaged in order to reel-in cable upon the drum. In a conventional arrangement, the normally engaged brake is simultaneously disengaged along with engagement of the clutch.

With the winch unit being arranged upon a log skidder or similar machine, an operator may be required to perform a number of control functions for the vehicle, the winch unit and possibly other implements as well. Accordingly, it is desirable to provide a single control element for operating the power train for the winch unit to accomplish both reeling-in and reeling-out modes of operation. A substantial load is normally secured to the cable during reeling-out operations of the type contemplated by the present invention. Accordingly, it is necessary to provide very fine modulation over disengagement of the brake in order to permit adequate operator control over the rate at which cable is reeled out from the drum. Reeling-in of the cable is also accomplished with a load normally attached to the cable. However, since reeling in of the cable is accomplished through a normally disengaged clutch, it is often desirable to provide a more rapid rate of modulation over engagement of the clutch as compared to disengagement of the brake discussed immediately above.

SUMMARY OF THE INVENTION

Accordingly, it is an object of the present invention to provide a control mechanism which is capable of operation under different rates of modulation in order to selectively actuate first and second motor means.

It is a further object of the invention to provide such a control mechanism including a control lever movable in first and second directions for respectively actuating the first and second motor means, first and second biasing means being operatively associated with the control lever to provide a first relatively low rate of modulation for movement of the control lever in the first direction and a second relatively high rate of modulation for movement of the control lever in the second direction.

It is a still further object of the invention to provide such a control mechanism for operating the power train of a winch unit.

Additional objects and advantages of the invention are made apparent in the following description having reference to the accompanying drawing.

DESCRIPTION OF THE DRAWINGS

FIG. 1 is a side elevation view of a log skidder vehicle including a towing or logging winch adapted for operation by the control mechanism of the present invention.

FIG. 2 is a schematic representation, of a drive train for the winch unit of FIG. 1.

DESCRIPTION OF THE PREFERRED EMBODIMENT

Figure 3:
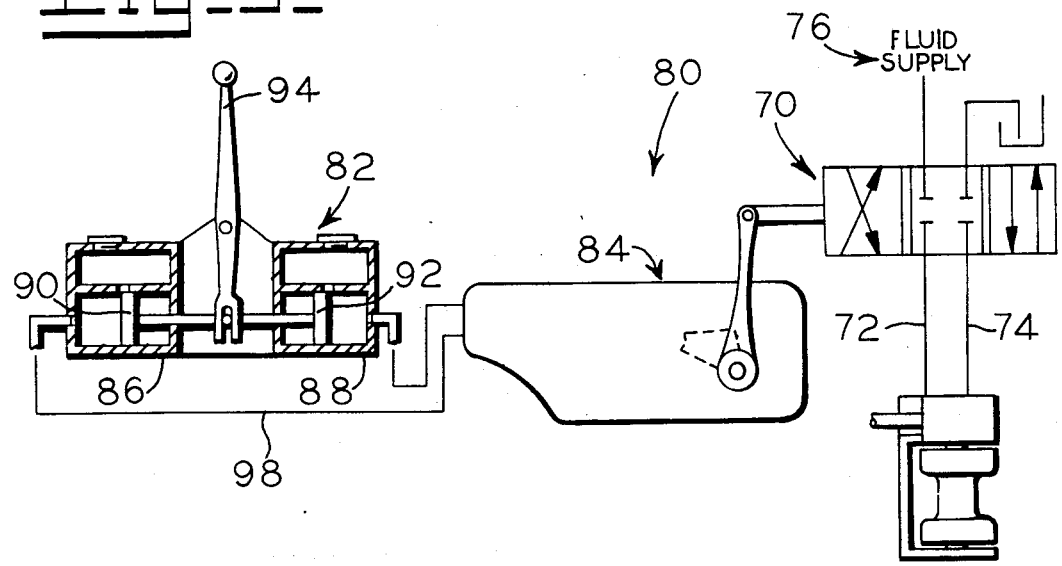
FIG. 3 is a partially schematic representation, with parts being illustrated in section, of a control mechanism constructed to the present invention and adaptable for regulating operation of the winch unit of FIGS. 1 and 2.

The control mechanism of the present invention is described below in particular detail relative to a winch unit of the type schematically represented in FIG. 2 and adapted for use on a log skidder as illustrated in FIG. 1. However, it will be apparent from the following description that the control mechanism may be employed for other applications as well, particularly applications wherein a single control lever is to be movable for regulating operation of first and second motor means at different rates of modulations.

Referring now to FIG. 1, the control mechanism of the present invention is particularly adapted for operation of a towing or logging winch included within a log skidder vehicle of the type indicated at 10 in FIG. 1. The vehicle includes a prime mover or engine as illustrated in phantom at 12. In order to adapt the vehicle for logging operations, it may include various implements such as a bulldozer blade 14 movably mounted upon one end of the vehicle. In order to also adapt the vehicle for towing operations, it includes an arch arranged upon the other end of the vehicle at 16 and a winch unit 18 adapted for operation by the control mechanism of the present invention.

Construction and operation of the winch unit 18 is described in greater detail below having reference also to FIG. 2. However, it is generally noted that the winch unit 18 is operable in either a reeling-in or reeling-out mode of operation in order to permit operator control over a load (not shown) connected to a cable 20 associated with the winch unit 18 as described below.

Referring also to FIG. 2, a power train indicated at 22 for the winch unit 18 includes a power input shaft 24 which may comprise a standard power take-off from the prime mover 12 for the vehicle in FIG. 1. The input shaft 24 is coupled by means of meshing transfer gears 26 and 28 with an input shaft 30 for a normally disengaged friction clutch 32. An output shaft 34 for the clutch 32 is coupled with a clutch output gear 36 which is also secured for rotation with a transfer gear 38. The clutch output gear 36 meshes with a brake gear 40, a normally engaged friction brake 42 being operable to secure the brake gear 40 against rotation.

The components described above comprise an intermediate portion of the drive train. The normally disengaged clutch 32 permits driving operation of the gear components within the intermediate drive through the input shaft 24. The normally engaged brake 42 tends to be disengaged as the clutch 32 is engaged and conversely tends to be engaged as the clutch 32 is disengaged. Thus, the brake 42 normally serves to prevent rotation of the intermediate drive train or at least those components on the output side of the clutch 32 when the clutch is disengaged. As described in greater detail below, the brake 42 is also adapted to be gradually disengaged without concurrent engagement of the clutch in order to permit reeling-out operation of the winch unit.

An output portion of the winch drive train 22 includes a transfer gear 44 arranged in meshing engagement with the transfer gear 38. The gear 44 is mounted upon an input shaft 46 for a bevel gear assembly 48 having bevel gears 50 and 52. A winch drum shaft 54 provides an output for the bevel gear assembly 48 with a winch drum 56 being arranged for rotation upon the shaft 54 by means of bearings 58 and 60. The cable 20 is trained about the winch drum 56 to permit reeling-in or reeling-out of the cable according to rotation of the drum 56 under influence of the brake 42 and/or the clutch 32.

The power train 22 also includes a normally engaged clutch 62 which may be separately disengaged to permit free-wheeling of the winch drum 56. The free-wheeling clutch 62 is arranged for selective engagement between the drum 56 and its shaft 54.

For purposes of the present invention, it is sufficient to understand that the brake 42 may be gradually disengaged in order to permit reeling-out of the cable 20 under an external load (not shown). On the other hand, the clutch 32 may be gradually engaged with concurrent gradual disengagement of the brake 42 in order to permit selective reeling-in of the cable 20. A control mechanism constructed according to the present invention for accomplishing these functions in a relatively simple manner is better illustrated in FIGS. 3 and 4.

Figure 4:
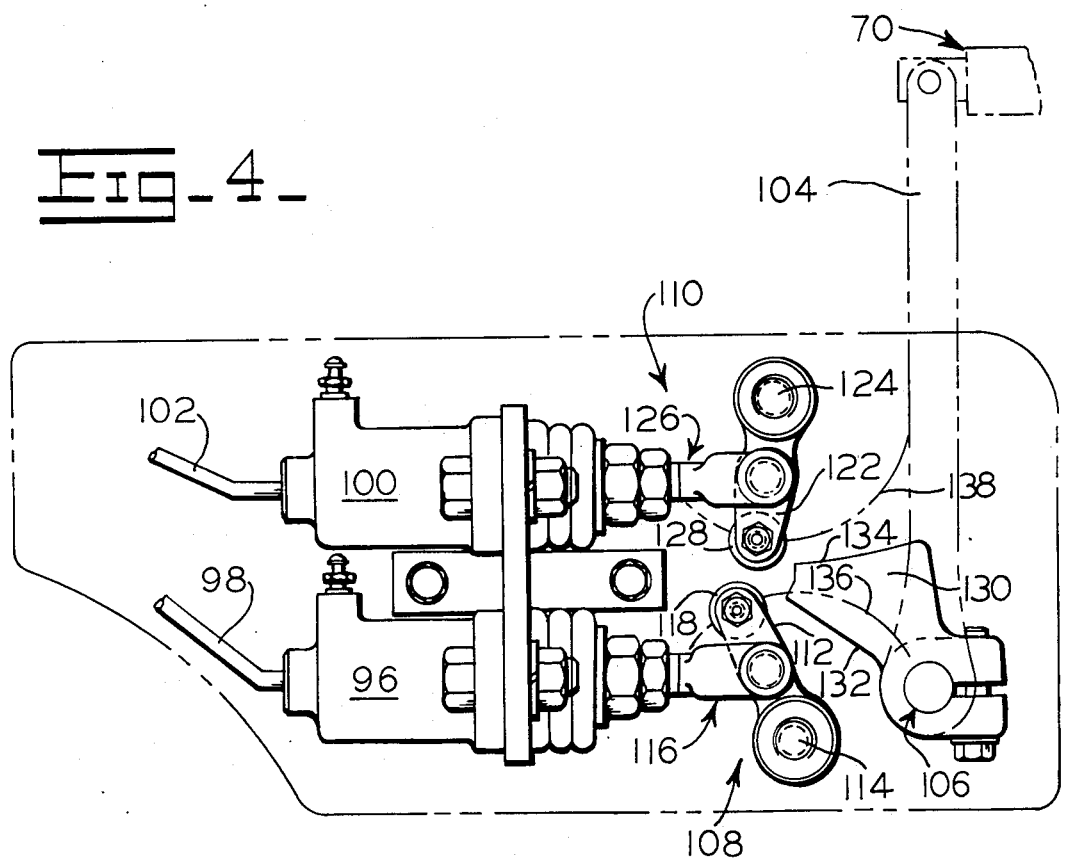
FIG. 4 is an enlarged fragmentary view of a portion of the control mechanism of FIG. 3 including a control lever together with first and second biasing means.

Referring now to FIG. 3, the winch drum 56 is generally illustrated together with the power train 22 which is hydraulically communicated with a control valve 70 by means of interconnected conduits 72 and 74. Having momentary reference to FIG. 2, it is sufficient for an understanding of the present invention to realize that as the valve or spool 70 is moved rightwardly, fluid under pressure from the source 76 is communicated to accomplish simultaneous engagement of the clutch 32 and disengagement of the brake 42. Accordingly, rightward movement of the valve 70 corresponds to reeling-in operation of the drum 56. On the other hand, as the valve 70 is moved leftwardly, fluid is communicated to the brake 42 to cause its gradual disengagement without concurrent operation of the clutch 32. This, of course, corresponds to reeling-out operation of the cable 20 under the influence of an external load (not shown).

Referring again particularly to FIG. 3, the control mechanism of the present invention is generally indicated at 80 and includes a manually operable master cylinder unit 82 with a slave unit 84 being responsive to the master cylinder unit 82 for adjusting or positioning the control valve 70.

The master cylinder unit 82 includes separate cylinders 86 and 88 including separate pistons 90 and 92 which are coupled in common to a single manual control element or lever 94.

The slave unit 84 includes a first slave cylinder 96 which is in responsive communication by means of a conduit 98 with the master cylinder 86. Another slave cylinder 100 is in responsive communication by means of a conduit 102 with the other master cylinder 88. The slave unit 84 also includes a control lever 104 which is pivotably mounted at 106 and coupled at its opposite end to the valve 70.

First and second biasing means 108 and 110 are respectively operated by the slave cylinders 96 and 100 in order to bias the control lever 104 and effect movement of the control valve 70 in opposite directions under different rates of modulation. For this purpose, the first biasing means 108 includes a lever 112 which is pivotably mounted at 114. A central portion of the lever 112 is pivotably connected to a piston 116 which is movable by the slave cylinder 96. The opposite end of the lever 112 rotatably supports a roller 118 which interacts with the lever 104 in a manner described below for accomplishing movement of the control valve 70 under a first rate of modulation.

The second biasing means 110 includes a similar lever 122 which is pivotably mounted at 124 with a central portion of the lever being pivotably coupled with a piston 126 which is movable within the slave cylinder 100. A roller 128 is also mounted upon the opposite end of the lever 122. As indicated above, the first and second biasing means 108 and 110 are designed to provide different modulation rates for the valve 70. This feature of the invention could be accomplished in a number of ways such as by varying the effective lengths of the levers 112 and 122. However, the different rates of modulation are preferably accomplished by means of a common control element 130 arranged for pivotable movement with the lever 104 about its axis 106 upon interaction with either of the roller 108 or 128. The different rates of modulation are accomplished through the configuration of separate surfaces 132 and 134 which are respectively arranged for interaction with the rollers 118 and 128. It may be seen in FIG. 4 that the rollers 118 and 128 are movable upon their levers 112 and 122 along arcs indicated respectively at 136 and 138. The angle of intersection for each of the surfaces 132 and 134 with the respective arcs 136 and 138 determines the rate of movement for the control lever 104 under the influence of either roller 118 or 128. For example, the surface 132 is arranged at a relatively sharp angle to the arc 136 so that as the slave cylinder 96 is actuated by the master cylinder 86 and the piston 116 urge the lever 112 toward the right, the roller 118 interacts with the surface 132 to cause relatively rapid movement of the control lever 104 rightwardly which results in a relatively high rate of modulation for the valve 70.

On the other hand, the surface 134 is arranged at a relatively slight angle with the arc 138. Accordingly, as the slave cylinder 100 is actuated by the master cylinder 88 and its piston 126 and lever 122 are urged rightwardly, interaction of the roller 138 with the surface 134 causes movement of the control lever 104 leftwardly at a relatively slow rate which results in modulation of the control valve 70 likewise at a relatively low rate.

Accordingly, it is believed obvious that movement of the control lever 104 through the two biasing means 108 and 110 clearly accomplishes operation of the control valve 70 under distinct rates of modulation while being controlled by the single manual control element or lever 94.

A powertrain, as particularly illustrated in FIG. 2 for operating a winch, is also described in greater detail within an application filed on Feb. 21, 1973, Application Ser. No. 334,354, now U.S. Pat. No. 3,822,003 assigned to the assignee of the present invention. The control mechanism of this invention may also be employed in other powertrains, for example, such as the reversible towing winch of U.S. Pat. No. 3,729,171 also assigned to the assignee of the present invention.

I claim:

1. A control mechanism for power train including first and second hydraulically operable motor means, and a source of fluid under pressure, the control mechanism comprising:
    a control valve for selectively communicating the source of fluid under pressure with the first and second motor means;
    control lever means for operating the control valve, the control lever means including a control lever and a common control element, the control lever movable in a first direction to actuate the first motor means, and the control lever movable in a second direction to hydraulically actuate the second motor means;
    manually operable means for positioning the control lever;
    first biasing lever means operably interconnected between said manually operable means and said common control element and cooperating with said common control element for moving said control lever in said first direction of travel at a relatively low rate of modulation; and
    second biasing lever means operably interconnected between said manually operable means and said common control element and cooperating with said common control element for moving said control lever in said second direction of travel at a relatively high rate of modulation.

2. The control mechanism of claim 1 wherein the common control element is arranged for pivotal movement with the control lever and defines separate surfaces arranged for effective interaction with the first and second biasing lever means.

3. The control mechanism of claim 2 wherein each biasing lever means comprises a biasing lever and a roller mounted thereupon arranged for interaction with the respective surfaces of the common control lever.

4. The control mechanism of claim 3 wherein the interacting surfaces on the carrier on control element are arranged at different effective angles with the arcs followed by the respective rollers upon the biasing levers.

* * * * *